United States Patent [19]

Hasegawa et al.

[11] Patent Number: 5,361,149
[45] Date of Patent: Nov. 1, 1994

[54] OPTIMIZED DESIGN METHOD FOR HOLOGRAPHIC OPTICAL ELEMENT AND APPARATUS USING SUCH HOLOGRAPHIC OPTICAL ELEMENT

[75] Inventors: Shinya Hasegawa; Shigeo Kayashima, both of Kawasaki, Japan

[73] Assignee: Fujitsu Limited, Kawasaki, Japan

[21] Appl. No.: 853,624

[22] Filed: Mar. 19, 1992

[30] Foreign Application Priority Data

Mar. 20, 1991 [JP] Japan .................. 3-056707

[51] Int. Cl.$^5$ .................. G02B 5/32; G03H 1/08
[52] U.S. Cl. .................. 359/9; 359/15; 359/16; 359/21
[58] Field of Search .................. 359/9, 16, 17, 18, 19, 359/21, 15

[56] References Cited

U.S. PATENT DOCUMENTS

| | | | |
|---|---|---|---|
| 3,614,190 | 10/1971 | Haines | 359/9 |
| 3,619,022 | 11/1971 | Hirsch et al. | 359/9 |
| 4,778,262 | 10/1988 | Haines | 359/9 |
| 4,969,700 | 11/1990 | Haines | 359/9 |

OTHER PUBLICATIONS

"Flat-filed linearized scans with reflection dichromated gelatin holographic gratings", by Yukihiro Ishii and Kazumi Murata, 15 Jun. 1984 /vol. 23, No. 12 pp. 1999-2006, Applied Optics.

"Reflection Holographic Lens Having Nonspherical Wavefront Designed By A microcomputer", by Yukihiro Ishii and Kazumi Murata, Optics Communications vol. 47, No. 5, 1 Oct. 1983, pp. 303-308.

"Optimal holographic Fourier-transform lens", by J. Kedmi and A. A. Friesem, Applied Optics/vol. 23, pp. 4015 to 4019.

"Analytic design of optimum holographic elements", by J. N. Cederquist and J. R. Fienup, vol. 4, No. 4/Apr. 1987, J. Opt. Soc. Am. A, pp. 699 to 705.

*Primary Examiner*—Martin Lerner
*Attorney, Agent, or Firm*—Staas & Halsey

[57] ABSTRACT

An optimized design method of a holographic optical element by calculating a correction coefficient so that an evaluating amount of a reconstructed light reconstructed by the holographic optical element can be minimized, the correction coefficient determining an aspheric term included in a phase transfer function, the phase transfer function representing a shape of an interference fringe recorded on the holographic optical element. According to the method, the wavefront aberration is expressed via a linear function of the correction coefficient by positioning a main axis point on a characteristic evaluating surface onto which the reconstructed light is projected, so that a wavefront aberration of the reconstructed light can be minimized. Then, the correction coefficient is calculated based on the linear function so that the evaluating amount can minimized.

20 Claims, 11 Drawing Sheets

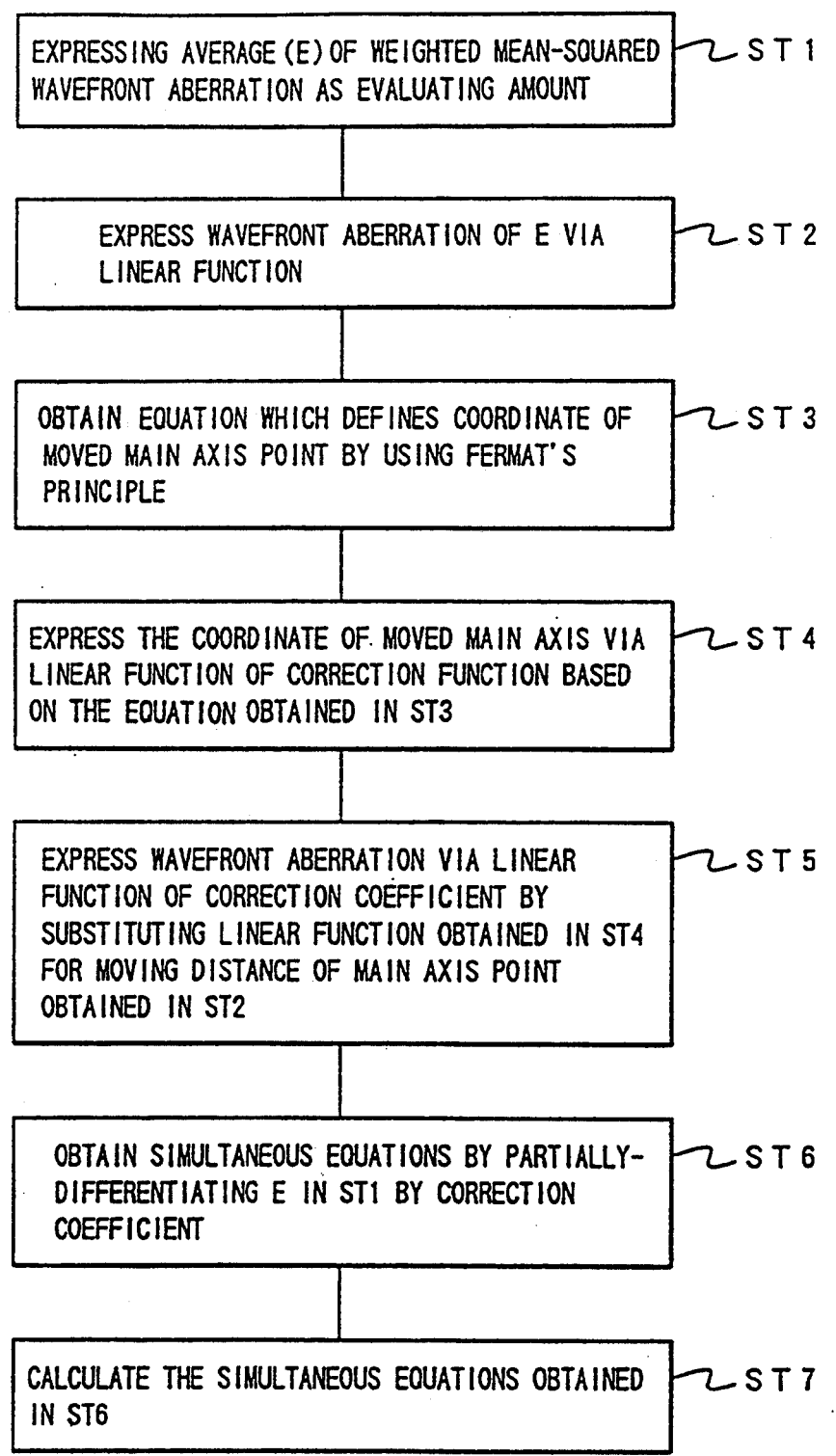
F I G. 1

HOLOGRAPHIC DISK (a) INITIAL DESIGN (b) OPTIMIZED DESIGN

OPTIMIZED DESIGN METHOD FOR HOLOGRAPHIC OPTICAL ELEMENT AND APPARATUS USING SUCH HOLOGRAPHIC OPTICAL ELEMENT

BACKGROUND OF THE INVENTION

The present invention relates to an optimized design method of a holographic optical element so that an error caused by aberration of the holographic optical element can be reduced, and an apparatus using such a holographic optical element.

Holographic optical elements (HOE's) are small, light-weight, thin-films which have the potential for being very inexpensive in a mass production. The elements have multiple functions such as laser beam focusing and scanning, beam-splitting, and spectral selectivity. HOE application have been demonstrated in various fields. HOE's can be used to perform wave phase transformations. In designing HOE's, it is important to minimize outgoing wavefront aberrations.

This is because the hologram's reference wave conditions are often different from those of the reconstructed incident wave. Since sensitivity of a sensitive plate becomes highly responsive to a wavelength shorter than that of a semiconductor laser beam, the reference wave having a wavelength shorter than that of the semiconductor laser beam is used. For example, in HOE's incidence angle and wave length differ between the constructed and reconstructed waves. In order to minimize the aberrations, it is necessary to use optimization procedures for designing a holographic element having a complicated grating function. There has been a great deal of research concerning optimized design methods for hologram phase transfer functions. Fairchild used numerical iterative ray-tracing techniques (R. C. Fairchild and J. R. Fienup, "Computer-originated aspheric holographic optical elements", Opt. Eng. 21, 133-140 (1982)).

A holographic laser scanner was designed by applying a similar method (Ishii and K. Murata, "Flat-field linearized scans with reflection dichromated gelatin holographic gratings", APPl.OPT.23, 1999-2006 (1984)). For these designs, the optimized routine is performed with the Damped Least Squares (DLS) method, which is also used for lens design. However, the DLS method has the following disadvantages:

(1) Extensive calculations of ray directions are required.
(2) Solutions often converge to local minima rather than to the desired absolute minimum.
(3) It is difficult to determine whether an optimal solution has been attained.

Winick proposed analytical optimization of phase transfer functions (K. Winick and J. Fienup, "Optimium holographic elements recorded with aspheric wavefronts", J. Opt. Soc. Am. 73, 207-217 (1983)). This method uses the mean-squared wavefront aberration as the error function. However, a complicated procedure is required to design phase transfer functions of holograms and it is necessary to resort to approximate solutions. Several methods were also proposed which uses the Fourier transform hologram. It seems, however, that complicated calculation is required for these methods. As a result, such optimization procedures do not yield an exact solution except in specific cases. These methods were never applied to designing holographic scanners. For holographic scanners, there is a method that avoids the DLS routine. For this method a spot diagram is used for an evaluation which is not made on the basis of diffraction theory. However, optical system aberration is small, geometric optical evaluation is insufficient; diffraction theory evaluation is required. There have been no method which satisfies both of the following condictions:

(1) The method must use the mean-squared wavefront aberration as the error function.
(2) The method must be applicable to optimized design of laser scanners.

The most difficult point is that the error function is a nonlinear equation of aspheric phase coefficients.

SUMMARY OF THE INVENTION

Accordingly, it is a general object of the present invention to provide a novel and useful optimized design method for a holographic optical element, and a novel and useful apparatus using such a holographic optical element.

A holographic optical element is generally designed by calculating a correction coefficient which defines an aspheric term included in a phase transfer function representing a shape of an interference fringe. The correction coefficient is determined so that a deteriorated characteristic amount of a reconstructed light via the holographic element can be minimized. In addition, the deteriorated characteristic amount is defined as a function of an aspheric aberration. Hereupon, the phase and the wavefront aberration of the holographic optical element at an image forming position are defined as follows:

(reconstructed light phase $\Phi_{out}$) = (incident wave phase $\Phi_{in}$) + (phase transfer function $\Phi_H$);

(wavefront aberration) = (reconstructed light phase) − (nonaberration reconstructed light phase).

The phase transfer function is defined as follows:

(phase transfer function) = (spheric term $\Phi_{H(0)}$) + (aspheric term).

Thus, the spheric aberration is defined as follows:

(wavefront aberration) = (incident wave phase) +

(transfer function) − (nonaberration reconstructed light phase) =

(incident wave phase) + (spheric term) +

(aspheric term) − (nonaberration reconstructed light phase).

According to the present invention, numerous convergence calculations are not required; the optimal solution can be usually obtained by one least squares method calculation. We successful applied this method to design of holographic disks for straight-line scanning obtaining an optimal phase transfer function. This method can be applied to optimized design of various holographic optical elements, as well as the design of straight-line holographic scanners.

Another object of the present invention is to provide an apparatus using such a holographic optical element designed in accordance with the aforementioned method.

According to the present invention, an apparatus with a sufficient performance can be provided.

Other objects and further features of the present invention will become apparent from the following detailed description when read in conjunction with the accompanying drawings.

BRIEF DESCRIPTION OF THE DRAWINGS

FIG. 1 shows a flowchart for explaining an optimized design method of a holographic optical element of a first embodiment according to the present invention;

DETAILED DESCRIPTION OF THE PREFERRED EMBODIMENTS

Next follows a description of an optimized design method of a holographic optical element according to the present invention. Concretely, a description of an optimized design for a hologram disk 21 in a straight-line beam scanner 20 will be given.

First, a description will now be given of the straight-line beam scanner 20 and the hologram disk 21.

Figure 3:
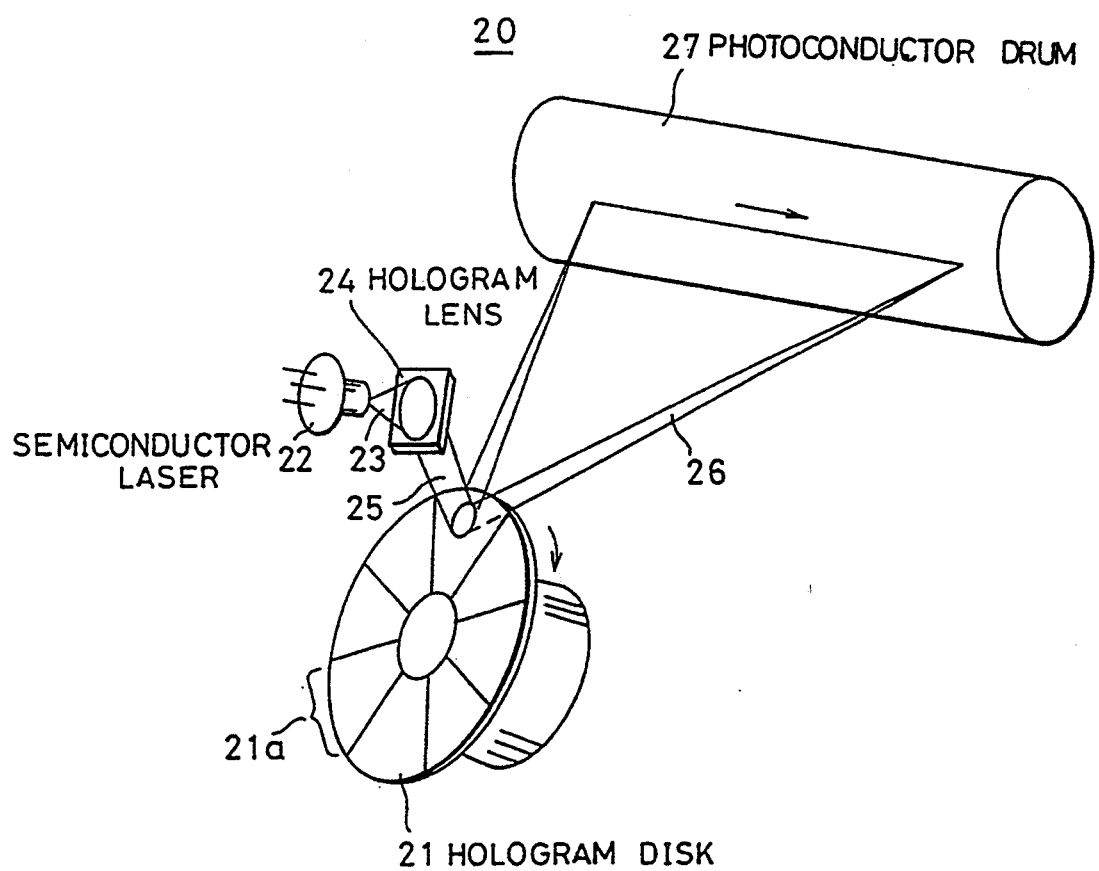
FIG. 3 shows a straight-line beam scanner using the method explained with reference to FIG. 1.

In FIG. 3, a divergent wave 23 from the laser diode 21 is wavefront-transformed into an incident wave 25 on the disk 21, by the holographic lens 24. Then the incident wave 25 is transformed into scanning beam 26 by the phase transfer function of the disk 21 and straight-line scanning is performed.

The hologram disk 21 includes a plurality of interferometric zone plates (IZP) 21a having an interference fringe shape generated by interfering the coherent plane and spheric waves having wavelengths shorter than the semiconductor laser 22 with each other. The hologram disk 21 is segmented into a plurality of zones in a circumferential direction. When a light is projected, as a reconstructed light which is a divergence wave, from the semiconductor laser 22 onto the hologram disk 21, a scanning beam 26 as a diffraction light forms an image on the photoconductor drum 27 by a number of zones per one rotation of the IZP 21a.

Figure 4:
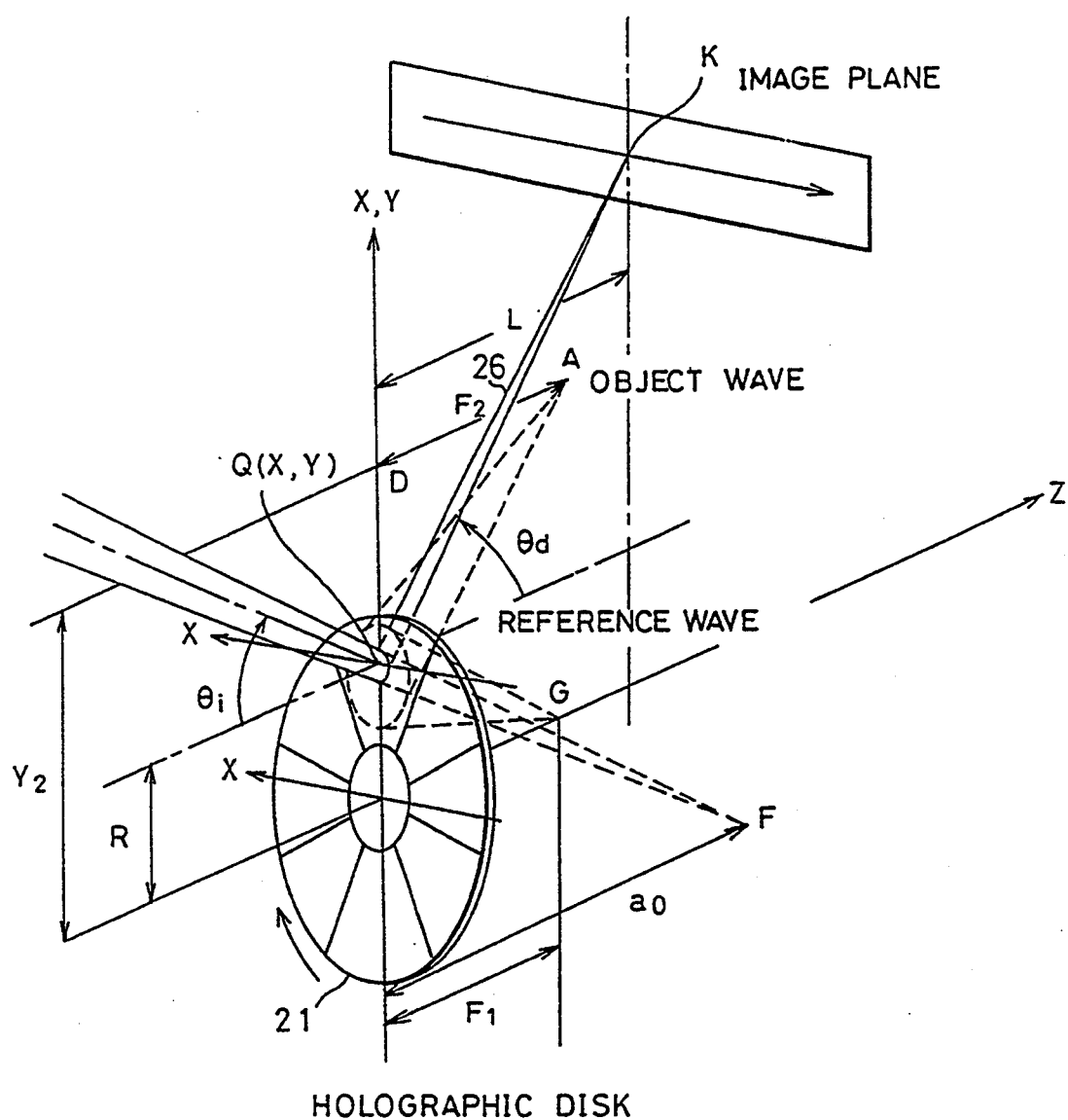
FIG. 4 shows a view for explaining a beam scanning of a hologram disk shown in FIG. 3.

FIG. 4 shows parameters for a straight-line scanning holographic disk using a divergent spherical wave as the reference wave. The reconstructed wave is a convergent spherical wave and differs from the reference wave. x-y-z coordinates are defined in the hologram plane and the z=0 plane is on the surface of the holographic disk. Reference wave G is a divergent spherical wave. $F_2$ is the distance between the disk and point light source A of the object wave. Point D is the projection of point light source A onto the disk. $y_2$ is the distance between point D and the center of the disk. R is the distance between the center of the disk and the principal axis of the reconstructed wave on the disk 21.

Figure 5:
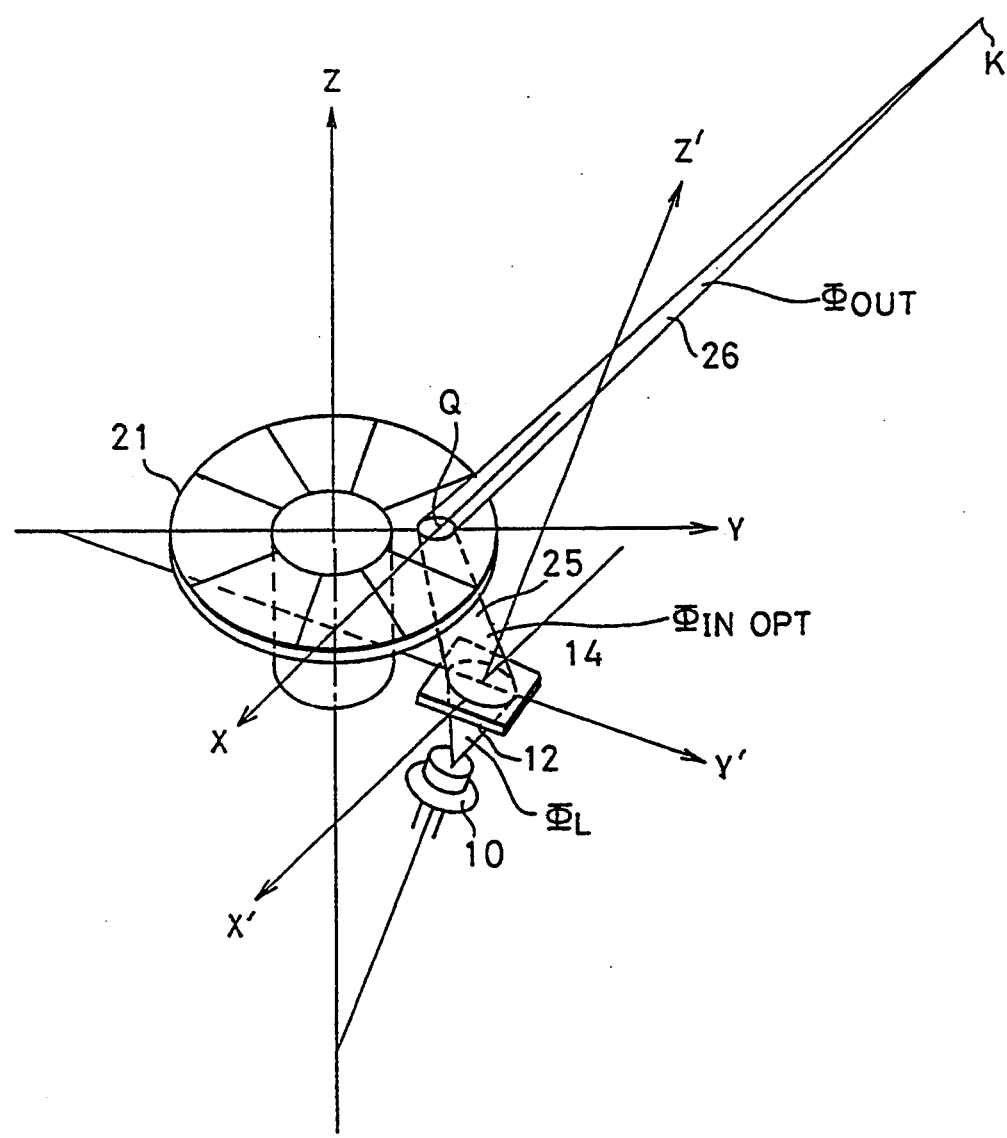
FIG. 5 shows a view for explaining a wavefront conversion in the hologram disk shown in FIG. 3.

FIG. 5 shows a view for explaining a wavefront conversion in the hologram disk shown in FIG. 3. In FIG. 5, the focal length to the scan surface is L and (X, Y) are coordinate based on the principal axis of the reconstruction wave of arbitrary point Q in the reconstruction wave area on the disk 21. Then, the phase $\Phi_{in}(X, Y)$ of the incident wave 25 of the disk 21 is transformed into the phase $\Phi_{out}^k(X, Y)$ of the scanning beam 26 at the each scanning point K.

Figure 2:
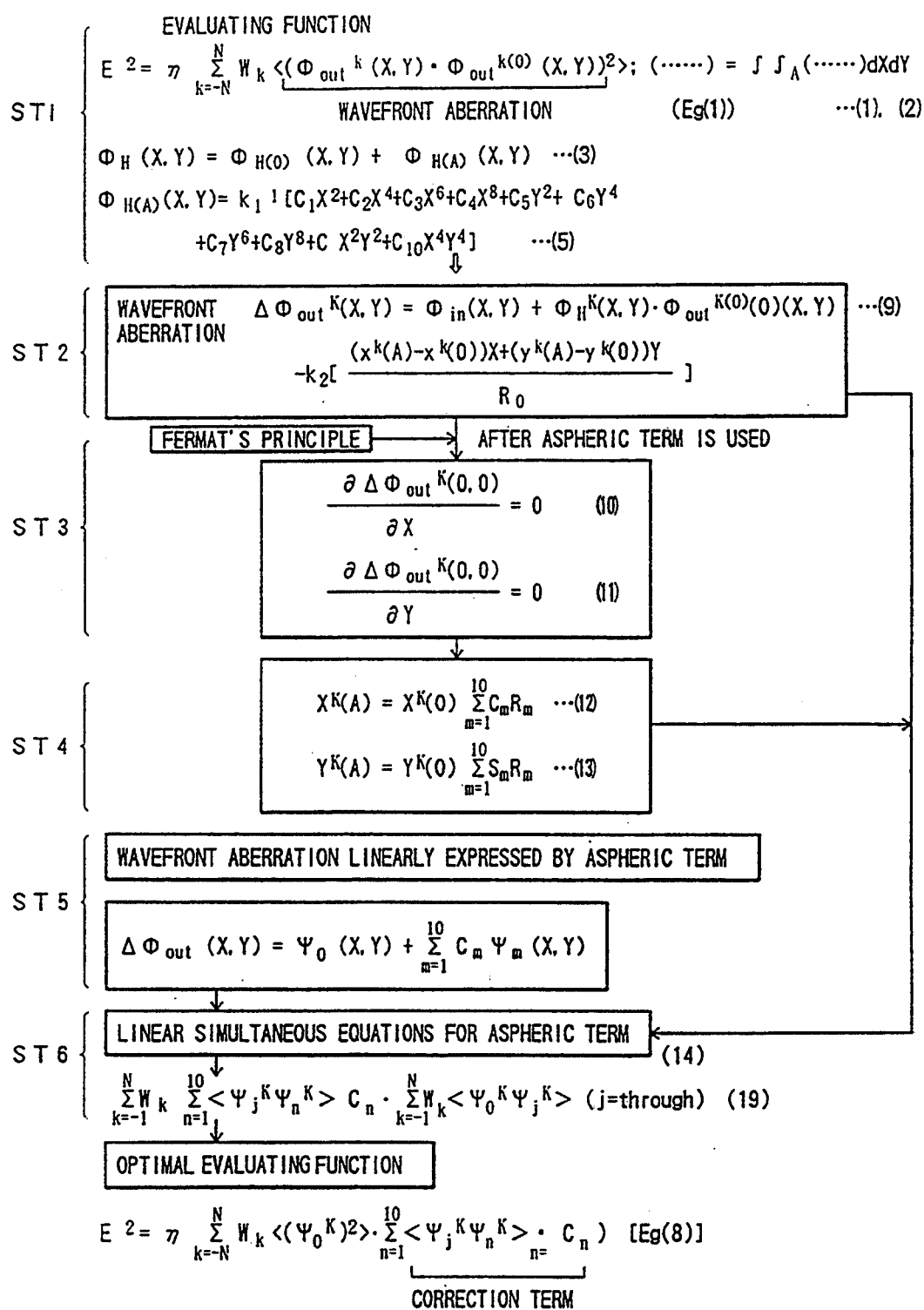
FIG. 2 shows a view demonstrating equations representing operations of respective steps shown in FIG. 1.

[OPTIMIZATION ALGORITHM] (Referring to FIGS. 1 and 2)

[Step 1]

An average of weighted mean-squared wavefront aberration E is adopted as the error function for aberration correction, then E is represented as follows:

$$E^2 = \eta \sum_{k=-N}^{N} W_k <\{\Delta\Phi_{out}^k(X,Y)\}^2>, \quad (1)$$

, where $<\ldots>$ indicates $\iint_A (\ldots) dXdY$, A is the disk reconstruction area, $W_k$ is the weighting function, $\eta$ is the normalization constant, which is $$1/\left(4\pi^2 \sum_{k=-N}^{N} W_k A\right),$$

and $\Delta\Phi_{out}^k(X, Y)$ is the wavefront aberration at scanning point K. If the phase with no aberration is assumed to be $\Phi_{out}^{k(0)}(X, Y)$, $\Delta\Phi_{out}^k(X, Y)$ is represented as follows:

$$\Delta\Phi_{out}^k(X, Y) = \Phi_{out}^k(X, Y) - \Phi_{out}^{k(0)}(X, Y) \quad (2)$$

Hereupon, Eq. (1) is nonlinear equation, and thus the least means square method cannot be applied thereto. Accordingly, an attempt is made to make linear the term $\Delta\Phi_{out}^k(X, Y)$ in Eq. (1).

If the aspheric correction term added to the holographic disk is represented by a polynominal of X and Y, the phase transfer function $\Phi_H(X, Y)$ of the hologram disk is represented as follows:

$$\Phi_H(X, Y) = \Phi_{H(0)}(X, Y) + \Phi_{H(A)}(X, Y) \quad (3)$$

where $\Phi_{H(0)}(X, Y)$ is a spheric term and defined as follows:

$$\Phi_{H(0)}(X, Y) = k1[\{X^2 + (Y+R)^2 + F_1^2\}^{\frac{1}{2}} - \{X^2 + (Y+R-y_2)^2 + F_2^2\}^{\frac{1}{2}}] \quad (4)$$

In addition, $\Phi_{H(A)}(X, Y)$ is an aspheric term and defined as follows:

$$\phi_{H(A)}(X,Y) = k1 \sum_i \sum_j C_{i+j} X^i Y^j = \quad (5)$$

$$k1[C_1 X^2 + C_2 X^4 + C_3 X^6 + C_4 X^8 +$$

$$C_5 Y^2 + C_6 Y^4 + C_7 Y^6 + C_8 Y^8 + C_9 X^2 Y^2 + C_{10} X^4 Y^4]$$

$\Phi_{H(0)}$ is obtained by holographic recording with constructed wavelength $\lambda_1$ (wave number $K1 = 2\pi/\lambda_1$) by using two divergent waves. $\lambda_2$ is the reconstruction wavelength longer than the construction wave length, K2 is the wave number, $K2=2\pi/\lambda_2$, and S is a ratio between two wavelengths $S=\lambda_2/\lambda_1$. The phase transfer function $\Phi_H{}^k(X', Y')$ at the scanning point K by rotating the disk through $\theta^k$ is obtained by assigning the following Eqs. (6) to (X', Y') in Eq. (3):

$$X' = X\cos\theta^k - (Y+R)\sin\theta^k;$$

$$Y' = X\sin\theta^k - (Y+R)\cos\theta^k - R \quad (6)$$

The incident wave 25 is spherical convergent; it's phase $\Phi_{in}(X, Y)$ is represented as follows:

$$\Phi_{in}(X, Y) = -k2\{X^2 + (Y+a_0\tan\theta_i)^2 + a_0{}^2\}^{\frac{1}{2}} \quad (7)$$

Then, $\Phi_{out}{}^k$ is obtained as follows:

$$\Phi_{out}{}^k(X, Y) = \Phi_{in}(X, Y) + \Phi_H{}^k(X, Y) \quad (8)$$

[Step 2]

Figure 6:
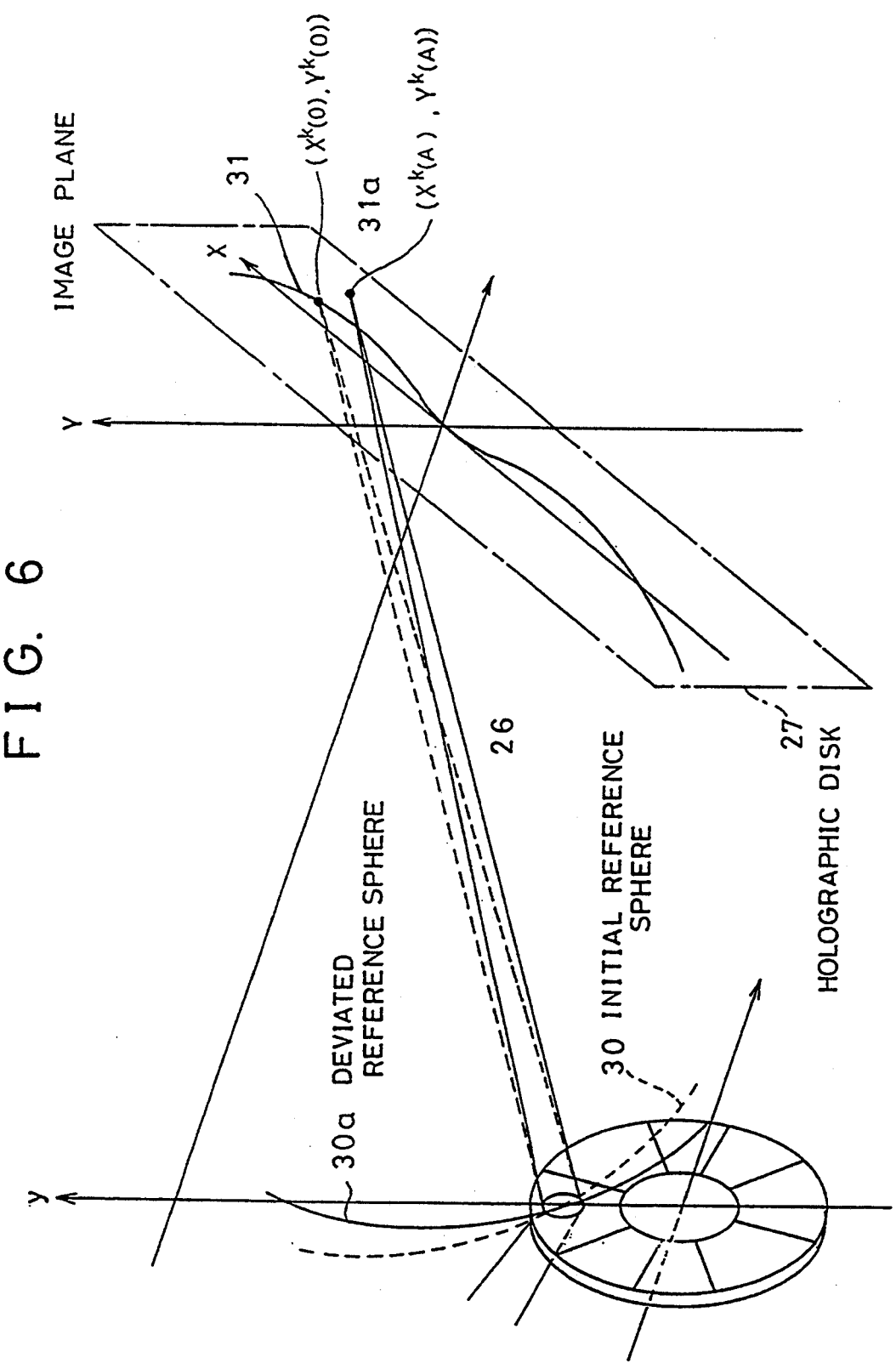
FIG. 6 shows a view of a shift geometry of Gaussian reference sphere having an aspheric term.

We examined representing $\Delta\Phi_{out}{}^k(X, Y)$ with a linear function of the aspheric phase correction coefficients $C_n$. In FIG. 6, the phase of Gaussian reference sphere 30 is assumed to be $\Phi_{out}{}^{k(0)}(0)(X, Y)$ when only $\Phi_{H(0)}(X, Y)$ is used. At this time, the coordinates $(x^k(0), Y^k(0))$ of the reference sphere center 31 are on the scan surface 27 of the principal axis of the scanning beam 26. The reference sphere 31 shifts to a reference sphere 31a because the aspheric term is added.

The center coordinates of the reference sphere shifts on the scan surface 27 of the principal beam axis $(x^k(A), y^k(A))$. In general, it is assumed that the aspheric term is small and that the deviation of reference sphere center from $(x^k(0), Y^k(0))$ to $(x^k(A), y^k(A))$ is also small as compared with the radius $R_0$ of the reference sphere 30. For this reason, the wavefront aberration $\Delta\Phi_{out}{}^k(X, Y)$ can be approximated as follows:

$$\Delta\phi_{out}^k(X,Y) = \Phi_{in}(X,Y) + \Phi_H{}^k(X,Y) - \quad (9)$$

$$\Phi_{out}^{k(0)}(0)(X,Y) - k2[\{(x^k(A) - x^k(0))X + (y^k(A) - y^k(0))Y\}/R_0]$$

[Step 3]

Then, by using Eq. (9) and Fermat's principle, the coordinates $(x^k(A), y^k(A))$ of the reference sphere center 31a, with the addition of the aspheric term can be obtained as follows:

$$\partial\Delta\Phi_{out}{}^k(0, 0)/\partial X = 0 \quad (10)$$

$$\partial\Delta\Phi_{out}{}^k(0, 0)/\partial Y = 0 \quad (11)$$

[Step 4]

By calculating Eqs. (10) and (11) obtained in the step 3, the coordinate $(X^k(A), y^k(A))$ of the center axis point 31a can be expressed by a linear function of the correction coefficient $\{C_n\}$. That is, in Eqs. (10) and (11), the coordinates $(x^k(A), y^k(A))$ is represented by $$x^k(A) = x^k(0) + SR_0\left[\sum_{n=1}^{4} 2n\{-C_n(R\sin\theta^k)^{sn-1}\cos\theta^k + \right.$$

$$C_{n+4}[R\cos\theta^{k-1}]^{2n-1}\sin\theta^k\} + \quad (12)$$

-continued $$\left.\sum_{n=1}^{2} 2nC_{n+8}R^{4n-1}\{\sin\theta^k(\cos\theta^{k-1})\}^{2n-1}(1 + \cos\theta^k - 2\cos^2\theta^k)\right]$$

$$y^k(A) = y^k(0) + SR_0\left[\sum_{n=1}^{4} 2n\{C_n(R^{2n-1}(\sin\theta^k)^{2n} + \right. \quad (13)$$

$$C_{n+4}[R(\cos\theta^{k-1})]^{2n-1}\cos\theta^k\} +$$

$$\left.\sum_{n=1}^{2} 2nC_{n+8}R^{4n-1}(\sin\theta^k)^{2n}(\cos\theta^{k-1})^{2n-1}(2\cos\theta^{k-1})\right]$$

[Step 5]

Express the wavefront aberration via the linear function of the correction coefficient by substituting Eqs. (12) and (13) obtained in the step 4 for a term of $k2[\{(x^k(A)-x^k(0))X+(y^k(A)-y^k(0))Y\}/R_0]$ in Eq. (9). Eqs. (12) and (13) is assigned to Eq. (9), and $\Delta\Phi_{out}{}^k(X, Y)$ can be represented by the linear equation of the coefficients $\{C_n\}$. This equation is give below:

$$\Delta\Phi_{out}^k(X,Y) = \Psi_0{}^k(X,Y) + \sum_{m=1}^{10} C_m\Psi_m{}^k(X,Y) \quad (14)$$

$$\Psi_0{}^k(X,Y) = \Phi_{in}(X,Y) + \Phi_H{}^k(X,Y) - \Phi_{out}^{k(0)}(X,Y) = \quad (15)$$

$$-k2\{X^2 + (Y + a_0\tan\theta_i)^2 + a_0{}^2\}^{\frac{1}{2}} +$$

$$k1[\{X^2 + (Y + R)^2 + F_1{}^2\}^{\frac{1}{2}} -$$

$$\{X^2 + (Y + R)^2 + Y_2{}^2 - 2Y_2[X\sin\theta^k + (Y + R)\cos\theta^k] + F_2{}^2\}$$

$$\Psi_m{}^k(X,Y) = k1[X^{2n}(\theta^k) + 2n(R\sin\theta^k)^{2n-1}(X\cos\theta^k - Y\sin\theta^k) \quad (16)$$

$$(n = 1, 2, 3, 4)$$

$$= k1[y^{2n-8}(\theta^k) - (2n-8)\{R(\cos\theta^{k-1})\}^{2n-9}(X\sin\theta^k + Y\cos\theta^k)$$

$$(n = 5, 6, 7, 8)$$

$$= k1[x^{2n-16}(\theta^k)y^{2n-16}(\theta^k) - (2n-16)R^{4n-33}\{\sin\theta^k(\cos\theta^{k-1})\}^{2n-17}\{X(1 + \cos\theta^k - \cos^2\theta^k) + Y\sin\theta^k(2\cos\theta^{k-1})\}]$$

$$(n = 9, 10),$$

where
$$X(\theta^k) = X\cos\theta^k - (Y + R)\sin\theta^k; \quad (17)$$
$$Y(\theta^k) = X\sin\theta^k - (Y + R)\cos\theta^k - R$$

With the above procedure, the wavefront aberration can be described with a linear equation of $\{C_n\}$. Consequently, it is possible to apply the least mean square method to the coefficient $C_n$ which minimizes E in Eq. (1).

[Step 6]

By partially-differentiating the evaluation function E in the step 1 with respect to each correction function $\{C_n\}$ so as to produce simultaneous equations:

$$\partial E_2/\partial C_n = \eta \sum_{k=-N}^{N} W_k <\Psi_n{}^k(X,Y)\Delta\Phi_{out}^k(X,Y)> = 0 \quad (18)$$

$(n = 1$ though $10)$

Eq. (18) shows the least mean square methods. With Eq. (18), a system of equations in $C_n$ can be obtained as follows:

$$\sum_{k=-N}^{N} W_K \sum_{n=1}^{10} <\Psi_j{}^k(X,Y)\Psi_n{}^k(X,Y)> C_n = \quad (19)$$

$$- \sum_{k=-N}^{N} W_K \langle \Psi_0^k(X,Y)\Psi_j^k(X,Y)\rangle \quad (j = 1 \text{ though } 10)$$

The above Eqs. (19) is calculated. The coefficients $C_n$ that minimize E is obtained by solving the simultaneous equations (19) by using ordinary computer library routines. By imposing the condition that $\Psi_n^k(X, Y)$ (n=1 though 10) are orthogonal to $\Delta\Phi_{out}^k$(represented by Eq. (18)), the minimum mean-squared wavefront aberration E, is given as follows:

$$E^2 = \eta \sum_{k=-N}^{N} W_k \langle \Psi_0^k(X,Y)\Delta\Psi_{out}^k\rangle = \quad (20)$$

$$\eta \sum_{k=-N}^{N} W_k \left[ (\Psi_0^k(X,Y))^2\rangle - \sum_{n=1}^{10} \langle \Psi_0^k(X,Y)\Psi_n^k(X,Y)\rangle C_n \right]$$

The second term in the right-hand side of Eq. (20) indicates the correction quantity. Integral calculation of coefficients $\langle \Psi_j^k(X, Y)\Psi_n^k(X, Y)\rangle$ and $\langle \Psi_0^k(X, Y)\Psi_j^k(X, Y)\rangle$ can be easily executed by using ordinary computer library routines.

[Optimized Design Method Including Aberration Correction for the Hologram Incident Wave]

Next to be described is another embodiment of the present invention, in a case where the hologram lens 24 for aberration correction of the incident wave 18 on the hologram disk 21 is added, as shown in FIG. 3.

Firstly, there is described incident wave aberration correction by means of the hologram lens 24. If Eqs. (2) and (8) are substituted for Eq. (1), the following equation results:

$$E^2 = \eta \sum_{k=-N}^{N} W_k \langle \{\Phi_{in}(X,Y) + \Phi_H^k(X,Y) - \Phi_{out}^{k(0)}(X,Y)\}^2\rangle \quad (21)$$

Aberration correction for $\Phi_{in}$ is an effective means to minimize E with the above equation. The optimal solution for $\Phi_{in}$ can be obtained as follows:

$$\partial E^2/\partial \Phi_{in}(X, Y)=0 \quad (22)$$

The optimal solution given below is obtained from Eq. (22).

$$\Phi_{in}^{opt}(X,Y) = \left( \sum_{k=-N}^{N} W_K \Psi_k^k(X,Y) \right) / \sum_{k=-N}^{N} W_K \quad (23)$$

$$(\forall (X, Y) \in A, \Psi_k(X,Y) = \Phi_{out}^{(k)}(X,Y) - \Phi_H^k(X,Y))$$

The above equation indicates that the optimal incident wave is the weighted average of the incident waves which do not cause any aberration at each scanning point. In this case, $\Delta\Phi_{out}^k(X, Y)$ is represented as follows:

$$\Delta\Phi_{out}^k(X,Y) = \left[ \sum_{i=-N}^{N} W_1\{\Phi_{out}^{1(0)}(X,Y) - \Phi_H^1(X,Y)\} \right] / \quad (24)$$

$$\sum_{i=-N}^{N} W_1 + \Phi_H^k(X,Y) - \Phi_{out}^{k(0)}(X,Y)$$

Therefore, $\Psi_n^k(X, Y)$ in Eq. (24) can be represented as follows:

$$\Psi_n^k(X,Y) = \left[ -\sum_{i=-N}^{N} W_1\Psi_n^1(X,Y) \right] / \sum_{i=-N}^{N} W_1 + \Psi_n^1(X,Y) \quad (25)$$

With the above procedure, $\Psi_n^1(X, Y)$ is given by Eqs. (15) and (16). Simultaneous equations (19) and (20) can be solved simultaneously in the same way. As stated above, addition of incident wave aberration correction by means of the hologram lens 24 enables more accurate overall aberration correction.

[Iterative Procedure]

Eq. (9) is a first order approximation. Precise solutions are obtained if the complete calculation is made with a more exact solution of Eq. (9). In iterative calculations, if the solution of $\{C_n\}$ obtained with (N−1) th calculation is assumed to be the initial value $C_n^{(N-1)}$, the wavefront aberration $\Delta\Phi_{out}^{K(N)}$ at the scanning point K with Nth calculation represented as follows:

$$\Delta\Phi_{out}^{K(N)}(X,Y) = \Phi_{in}(X,Y) + \Phi_{H(0)}^k(X,Y) + \quad (26)$$

$$\Phi_{H(A)(N)}^k(X,Y) - \Phi_{OUT}^{k(0)(N-1)(A)}(X,Y) - K2 \, [(x^{K(N)(A)} -$$

$$x^{K(N-1)(A)})X + (y^{K(N)(A)} - y^{K(N-1)(A)})Y]/R_{(N-1)}$$

, where $\Phi_{H(A)(N)}^k$ is the correction term of the Nth aspheric phase coefficient $C_n(N)$. At the scanning center, it is represented as follows:

$$\Phi_{H(A)(N)}^0(X,Y) = k1 \sum_i \sum_j C_{i+j}(N)X^iY^j \quad (27)$$

$\Phi_{H(A)(N)}^k$ can be obtained by assigning Eq. (6) to Eq. (27). $\Phi_{OUT}^{k(0)}(N-1)(0)$ is the phase of the (N−1)th outgoing wave. $(x^{K(N)}(A), y^{K(N)}(A))$ is the Nth scanning position of the principal beam axis. $(x^{K(N-1)}(A), y^{K(N-1)}(A))$ is the (N−1)th scanning position of the principal beam axis. $R_{(N-1)}$ indicates the radius of the (N−1)th Gaussian reference sphere. The goal of the present invention is to obtain the correction coefficient $C_n(N)$ for the Nth optimization by using the solution $C_n^{(N-1)}$ obtained by (N−1)th operation as the initial value. As explained above, the Nth scanning position $(x^{K(N)}(A), y^{K(N)}(A))$ of the principal beam axis can be obtained by using Eq. (26) and Fermat's principle. This scanning position is given as follows:

$$x^{K(N)}(A) = SR_{(N-1)}\left[ \{y_2\sin\theta^k/(R^2 + y_2^2 - 2y_2R\cos\theta^k + \quad (28) \right.$$

$$F_2^2)^{\frac{1}{2}}\} +$$

$$\sum_{n=1}^{4} 2n\{-C_n^{(N)}(R\sin\theta^k)^{2n-1}\cos\theta^k + C_{n+4}^{(N)}(R\cos\theta^k-1)^{2n-1}\sin\theta^k\} +$$

$$\left. \sum_{n=1}^{2} 2nC_{n+8}^{(N)}R^{4n-1}\{\sin\theta^k(\cos\theta^k-1)\}^{2n-1}(1 + \cos\theta^k - 2\cos^2\theta^k) \right]$$

$$y^{K(N)}(A) = SR_{(N-1)}\left[ \{y_2\cos\theta^k - R)/(R^2 + y_2^2 - \quad (29) \right.$$

-continued $$2y_2R\cos\theta^k + F_2{}^2)^{\frac{1}{2}}\} +$$

$$\sum_{n=1}^{4} 2n\{C_n^{(N)}R^{2n-1}(\sin\theta^k)^{2n} + C_{n+4}^{(N)}(R\cos\theta^{k-1})^{2n-1}\cos\theta^k\} +$$

$$\sum_{n=1}^{2} 2nC_{n+8}^{(N)}R^{4n-1}(\sin\theta^k)^{2n}(\cos\theta^{k-1})^{2n-1}(2\cos\theta^k - 1)\Bigg]$$

The Nth wavefront aberration $\Delta\Phi_{out}^{K(N)}$ is obtained by assigning Eqs. (28) and (29) to Eq. (26). Thus, $\Delta\Phi_{out}^{K(N)}$ can be represented by a linear equation with the coefficients $C_n(N)$ as follows:

$$\Delta\Phi_{out}^{K(N)} = \Psi_0^{k(N)}(X,Y) + \sum_{m=1}^{10} C_m(N)\Psi_m^{k(N)}(X,Y) \quad (30)$$

$$\Psi_0^{k(N)}(X,Y) = \Phi_{in}(X,Y) + \Phi_{H(0)}^k(X,Y) - \Phi_{out}^{k(0)(N-1)}(A)(X,Y) - \quad (31)$$

$$k2\ [\{(Sy_2\sin\theta^k)/(R^2 + y_2{}^2 - 2y_2R\cos\theta^k + F_2{}^2)^{\frac{1}{2}} -$$

$$x^{K(N-1)}(A)/R_{(N-1)}\}X + \{S(y_2\cos\theta^k - R)/(R^2 +$$

$$y_2{}^2 - 2y_2R\cos\theta^k + F_2{}^2)^{\frac{1}{2}} - y^{K(N-1)}(A)/R_{(N-1)}\}Y]$$

$$\Phi_{OUT}^{k(0)(N-1)}(A)(X,Y) = \quad (32)$$

$$-k2\ [\{X - x^{K(N-1)}(A)\}^2 + \{Y + R - y^{K(N-1)}(A)\}^2 + L^2]^{\frac{1}{2}}$$

The (N−1)th scanning position $(x^{K(N-1)}(A), y^{K(N-1)}(A))$ can be obtained by using $C_n^{(N-1)}$ in Eqs. (28) and (29). Radius $R_{(N-1)}$ of the (N−1)th reference sphere is represented as follows:

$$R_{(N-1)}=[x^{K(N-1)}(A)^2+\{R-y^{K(N-1)}(A)\}^2+L^2]^{\frac{1}{2}} \quad (33)$$

$\Psi_m^{K(N)}$ is the same as Eq. (16). Then, Eq. (30) is obtained, and an optimal solution, $C_n^{(N)}$, can be obtained from Eq. (19). These equations can also be used when incident wave aberration correction (explained in Sec. 3) is added. Thus, the solution can be convergent by iterative calculations.

[Optimized Algorithm Executed by a Calculator]

Figure 7:
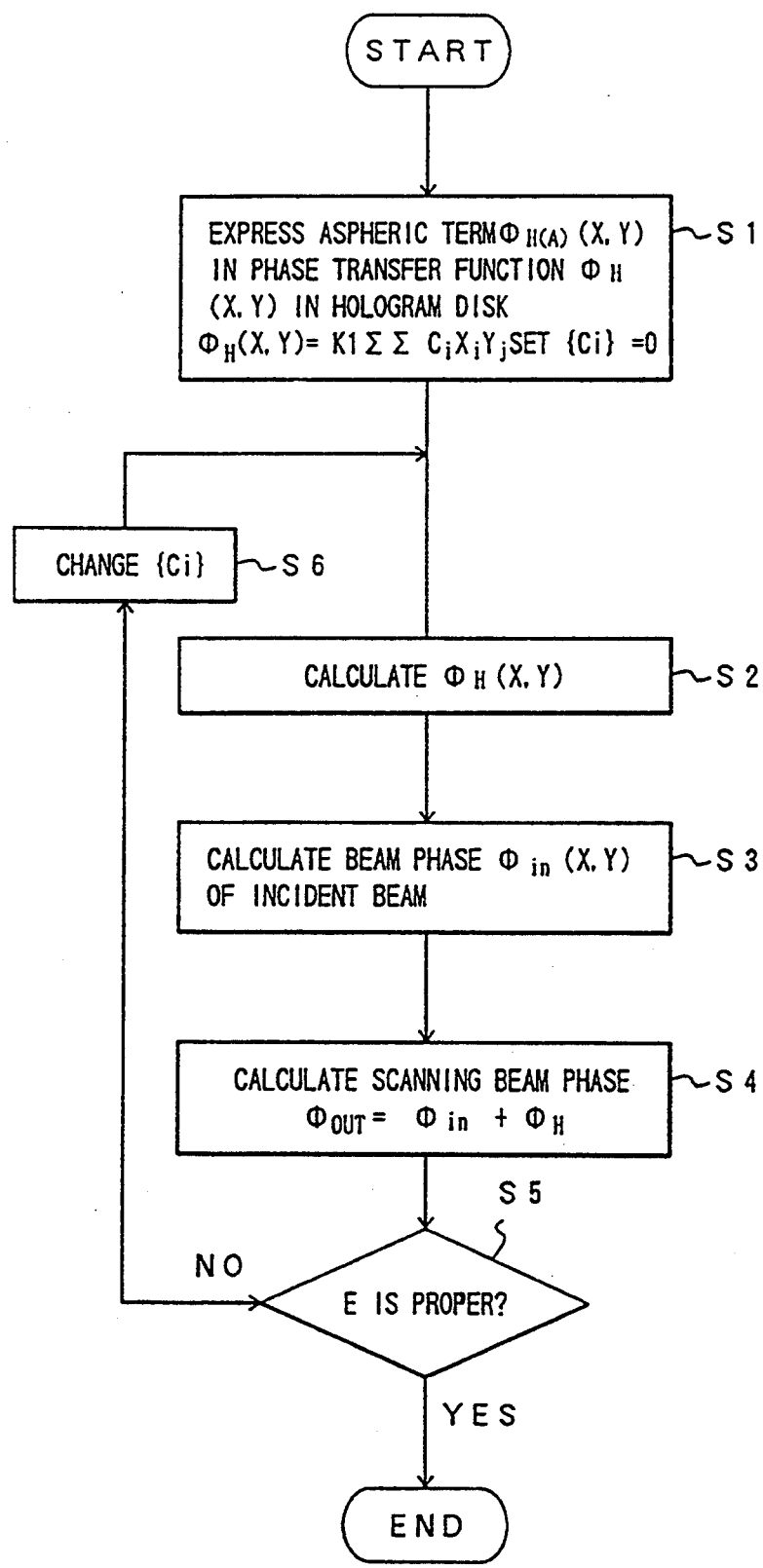
FIG. 7 shows a view representing an optimal algorithm executed by a calculator based on the method according to the present invention.

FIG. 7 shows an algorithm executed by a calculator which designs a hologram disk in accordance with the optimized design method according to the present invention. The algorithm comprises the following steps S1 to S6.

The aspheric term $\Phi_{H(A)}(X, Y)$ of the phase transfer function $\Phi_H(X, Y)$ of the hologram disk 21 is defined, as shown in Eq. (3), as a linear equation (in step S1). In addition, the initial coefficient $C_n$ is set to 0. Next, the transfer function $\Phi_H(X, Y)$ is calculated from Eq. (3) (in step S2). The beam phase $\Phi_{in}(X, Y)$ of the incident wave 25 is calculated from Eq. (7) (in step S3). The scanning beam phase $\Phi_{out}$ by adding the phase transfer function $\Phi_H(X, Y)$ and $\Phi_{in}(X, Y)$ (in step S4). Whether or not E is proper is judged. If E is not proper, the correction coefficient $\{C_n\}$ of the aspheric term is exchanged for a value calculated in accordance with the optimized design method according to the present invention (in step S5). By establishing the coefficient $\{C_n\}$ which is calculated in accordance with the optimized design method according to the present invention, a result which satisfies the condition in the step S5 can be obtained within only one calculation routine.

[Calculation Results]

Next to be described is calculation results when attempted to optimized holographic disks for straight-line scanning, by using the method with the highest aberration correction capability. A laser diode 12 (wavelength: 780 nm) is used as the reconstruction light source. The disk radius R is 40 mm (beam incidence position) and scanning width is 252 mm. Scanning is possible when the deviation from a straight line is ±0.1 mm (initial value). The straight line scanning uses the difference between hologram reconstruction wavelength and construction wavelength.

Here, for making the holographic disk 24 small, wavelength $\lambda_1$ of the constructed wave is set to 488.0 nm. The final length L is set to 205 mm. The scanning beam F/NO is set to 60. F/NO is represented by (radius of incident beam to the disk)/(focal length).

Figure 8:
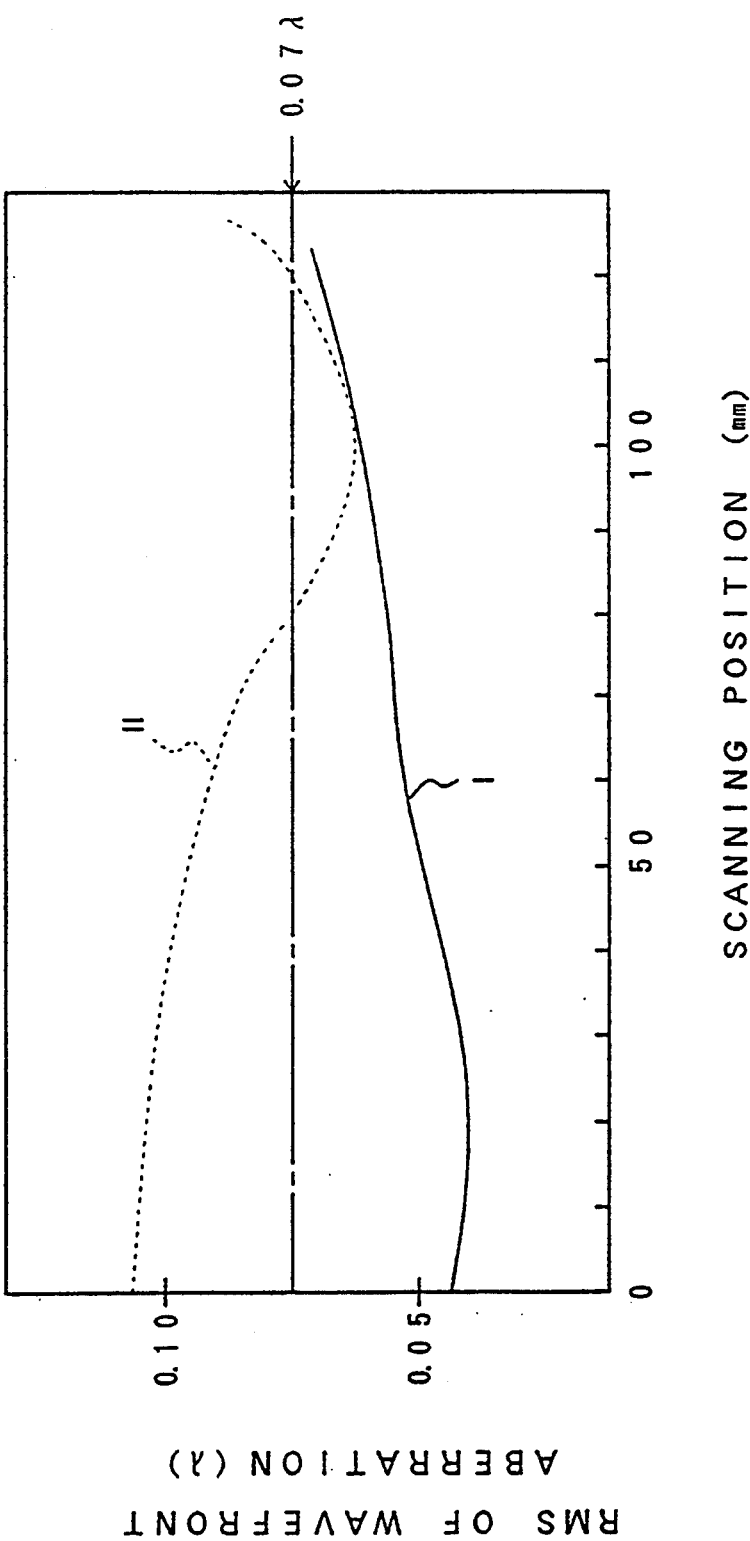
FIG. 8 shows a view of a beam scanning position of a holographic element designed by the method according to the present invention.

FIG. 8 shows the wavefront aberration RMS. When optimization using initial value and aspheric coefficient is done, the wavefront aberration RMS becomes as indicated by a line I. Another line II shows wavefront aberration RMS before optimization, that is, when $\{C_n\}=0$.

According to the optimization of the present invention, the wavefront aberration RMS on the whole scanning zone can be improved less than 0.07λ, which is the Marechal's criterion for giving a diffraction limit, in comparison with the conventional worst value 0.11λ. In addition, since the initial value is properly aberration-corrected, the aspheric coefficient can be made small while the scanning locus is hardly affected.

Figure 9:
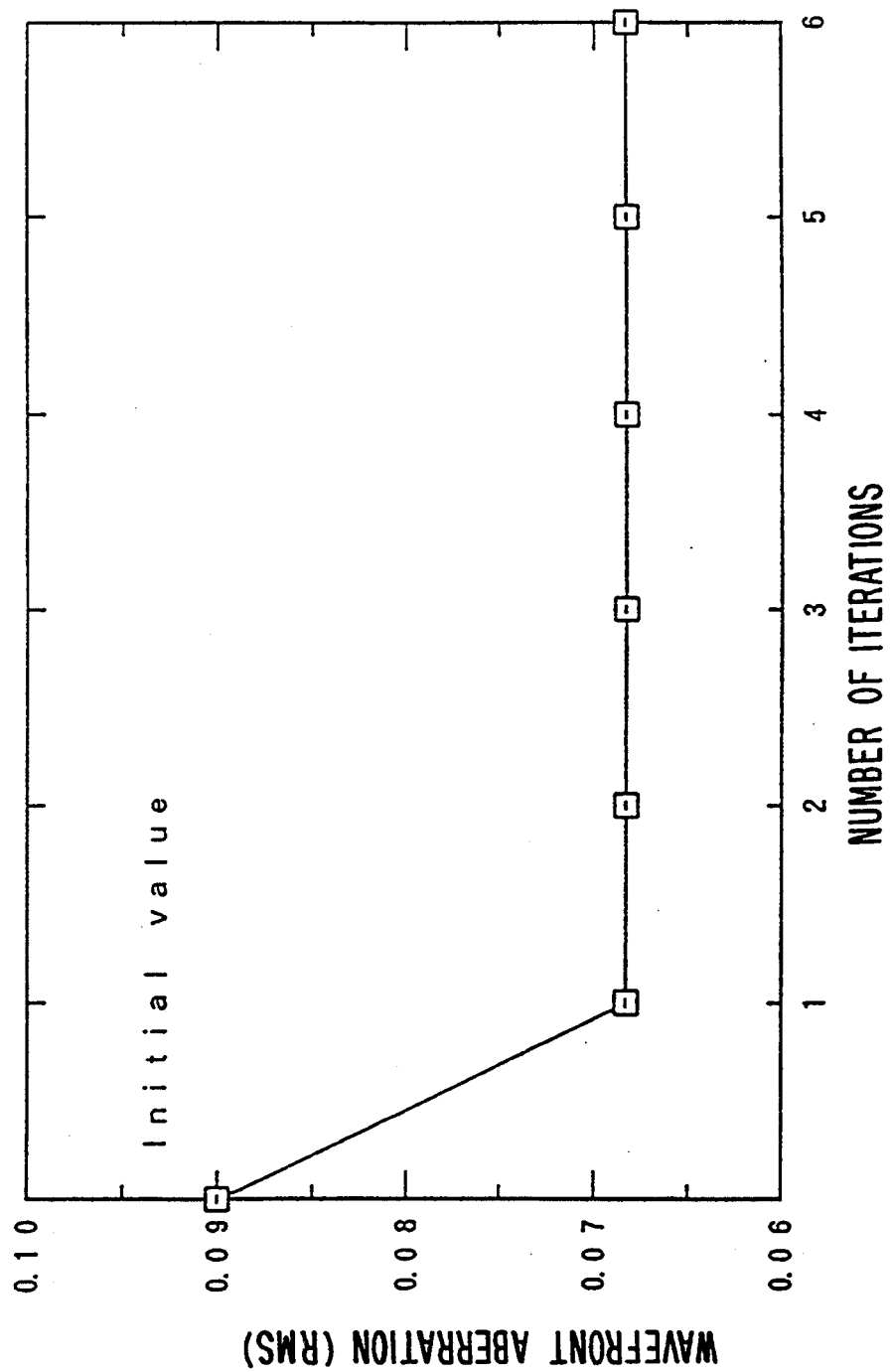
FIG. 9 shows a view of a convergent property of RMS using the method according to the present invention.
Figure 10A:
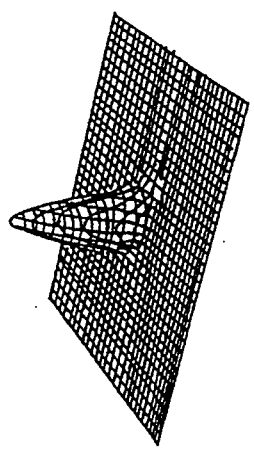
FIGS. 10A, 10B, 10C and 10D show view of an initial and an optimized hologram intensity distributions and contour lines of the distribution.
Figure 10C:
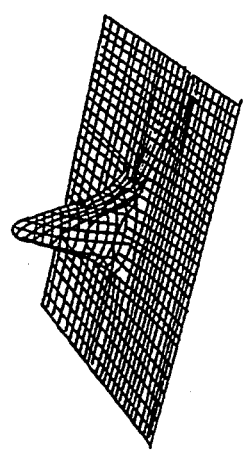
Figure 10B:
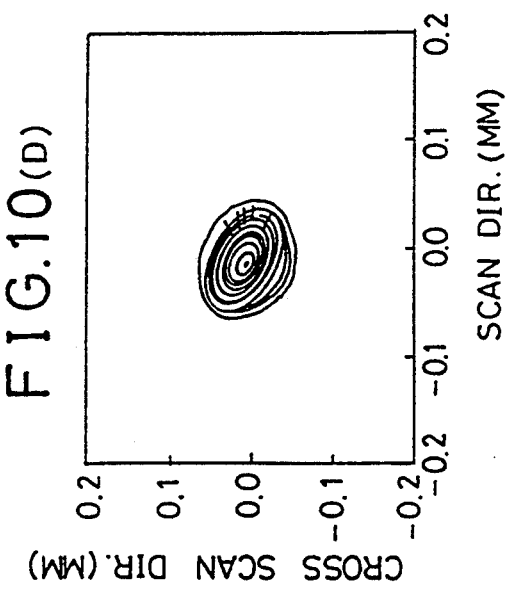
Figure 10D:
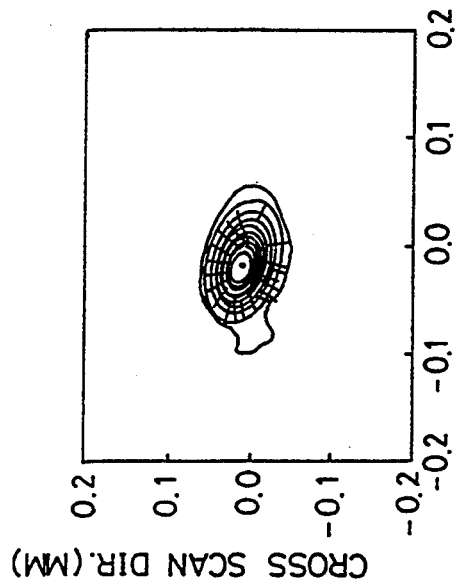

FIG. 9 shows the wavefront aberration RMS when optimization using initial value is done. High solution convergence was attained. Normally, good solutions were obtained with the first optimization. A small difference, in order of $10^{-3}$ occurred in the second optimization. After that, the solution remained constant. The results indicate that the wavefront aberration RMS changes from 0.11λ to 0.068λ and that this scanner can be improved to a diffraction-limited system. The aberration correction results for initial values were comparatively good. we confirmed that the aspheric phase coefficient was small and that the locus was hardly affected.

FIG. 10 shows the initial value and optimized value of the scanning beam intensity distribution by using the aspheric phase coefficient obtained from the first optimization. Initially aberration occurs at the scanning end and a flare is seen as shown in FIGS. 10(A) and 10(B). After the optimization, a high-resolution beam spot size of 75 μm (1/$e^2$), of the diffraction limit, could be obtained, as shown in FIGS. 10(C) and 10(D). These results prove that the method is effective for design.

Figure 11:
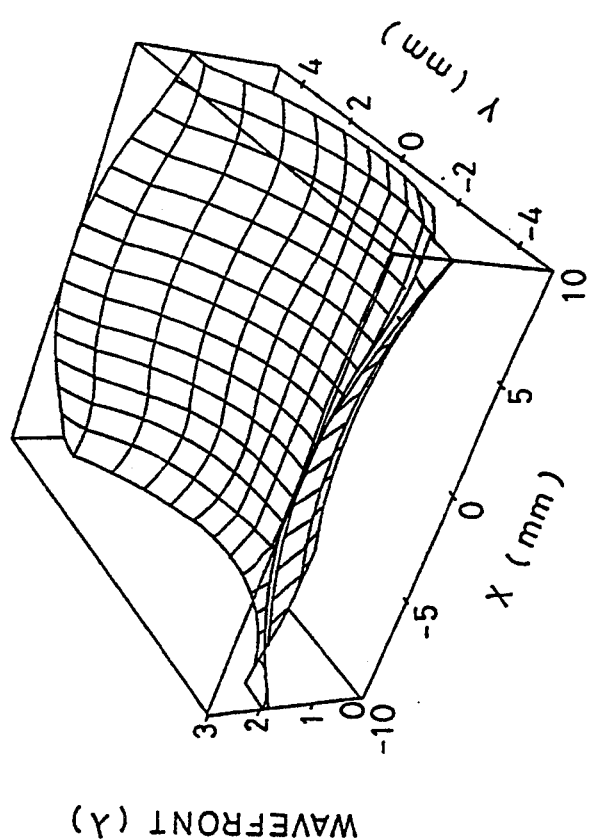
FIG. 11 shows a view of 3-D plot of the optimized aspheric wavefront.

FIG. 11 shows the 3-D plot of the optimized aspheric wavefront. A hologram with an optimal phase transfer function can be constructed by holographic recording of the aberration wave by auxiliary optics. It can also be constructed by drawing with electron beams. This method enables linearity straightness and wavefront aberration optimization. This is because that the scanning position $(x^{k(N)}(A), y^{k(N)}(A))$ is represented by a linear equation of the aspheric phase coefficients $C_n^{(N)}$, as shown in Eqs. (28) and (29). Therefore, the optimal solution can be obtained by the least squares method shown in Eq. (18). This method can be easily applied to optimized design of various holographic optical element, as well as the design of straight holographic scanners, if all of these characteristics are used in the error function. The holographic recording is described in U.S. Pat. No. 4,948,213 and U.S. Pat. No. 4,957,336.

Further, the present invention is not limited to these preferred embodiments, and various HOE's variations and modifications may be made without departing from the scope of the present invention.

What is claimed is:

1. An optimized design method of a holographic optical element by calculating a correction coefficient so that an evaluating amount of a reconstructed light reconstructed by the holographic optical element can be minimized, the correction coefficient determining an aspheric term included in a phase transfer function, and the phase transfer function representing a shape of an interference fringe recorded on the holographic optical element, said method comprising the steps of:

expressing a wavefront aberration via a linear function of the correction coefficient by positioning a main axis point on a characteristic evaluating surface onto which the reconstructed light is projected, so that the wavefront aberration of the reconstructed light can be minimized; and calculating the correction coefficient based on said linear function so that the evaluating amount can minimized.

2. A method as in claim 1, further comprising the step of:

calculating the correction coefficient again by correcting the correction coefficient if the evaluating amount calculated from the correction coefficient is not proper.

3. An apparatus using a holographic optical element designed in accordance with the method in claim 2.

4. An apparatus using a holographic optical element designed in accordance with the method as in claim 1.

5. An optimized design method of a holographic optical element by calculating a correction coefficient so that an evaluating amount of a reconstructed light reconstructed by the holographic optical element can be minimized, the correction coefficient determining an aspheric term included in a phase transfer function, the phase transfer function representing a shape of an interference fringe recorded on the holographic optical element, said method comprising the steps of:

expressing the evaluating amount as an average of a weighted mean-squared wavefront aberration of the reconstructed light at a main axis point on a characteristic evaluating surface onto which the reconstructed light is projected;

expressing the average of the weighted mean-squared wavefront aberration via a first linear-function, the first linear-function including a phase of an outgoing wavefront surface from the holographic optical element before an aspheric term is used, and a moving distance of the main axis point while the aspheric term is being used;

obtaining an equation which defines a coordinate of a moved main point axis by means of the first linear-function and Fermat's principle;

expressing, based on said equation, the coordinate of the moved main axis point via a second linear-function of the correction coefficient, so as to obtain a third linear-function;

expressing the wavefront aberration of the reconstructed light via the second linear-function of the correction coefficient by substituting the third linear-function for the first linear-function;

obtaining linear simultaneous equations which define the correction coefficient by partially-differentiating the third linear-function by the correction coefficient; and calculating the correction coefficient in accordance with said linear simultaneous equations.

6. A method as in claim 5, further comprising the step of:

calculating the correction coefficient again by correcting the correction coefficient if the evaluating amount calculated from the correction coefficient is not proper.

7. An apparatus using a holographic optical element designed in accordance with the method in claim 6.

8. An apparatus using a holographic optical element designed in accordance with the method in claim 5.

9. An optimized design method of a holographic optical element with a plurality of zones, by calculating a correction coefficient so that a total of an evaluating amount of a reconstructed light reconstructed by the holographic optical element for each zone can be minimized, the correction coefficient determining an aspheric term included in a phase transfer function, and the phase transfer function representing a shape of an interference fringe recorded on the holographic optical element, said method comprising the steps of:

expressing a wavefront aberration via a linear function of the correction coefficient by positioning a main axis point on a characteristic evaluating surface onto which the reconstructed light is projected, so that the wavefront aberration of the reconstructed light can be minimized; and calculating the correction coefficient based on said linear function so that the evaluating amount can minimized.

10. A method according to claim 9, wherein an incident light onto each zone of the holographic optical element is generated from a aberration-correcting holographic optical element located at a previous stage, said method simultaneously calculating correction coefficients of interference fringes of both the holographic optical element and the aberration-correcting holographic optical element.

11. An apparatus using both the holographic optical element and the aberration-correcting holographic optical element designed in accordance with the method according to claim 10.

12. A method as in claim 9, further comprising the step of:

calculating the correction coefficient again by correcting the correction coefficient if the evaluating amount calculated from the correction coefficient is not proper.

13. An apparatus using a holographic optical element designed in accordance with the method in claim 12.

14. An apparatus using a holographic optical element designed in accordance with the method in claim 9.

15. An optimized design method of a holographic optical element with a plurality of zones, by calculating a correction coefficient so that a total of an evaluating amount of a reconstructed light reconstructed by the holographic optical element for each zone can be minimized, the correction coefficient determining an aspheric term included in a phase transfer function, and the phase transfer function representing a shape of an interference fringe recorded on the holographic optical element, said method comprising the steps of:

expressing the evaluating amount as an average of a weighted mean-squared wavefront aberration of the reconstructed light at a main axis point on a characteristic evaluating surface onto which the reconstructed light is projected;

expressing the average of the weighted mean-squared wavefront aberration via a first linear-function, the first linear-function including a phase of an outgoing wavefront surface from the holographic optical element before an aspheric term is used, and a moving distance of the main axis point while the aspheric term is being used;

obtaining an equation which defines a coordinate of a moved main point axis by means of the first linear-function and Fermat's principle;

expressing, based on said equation, the coordinate of the moved main axis point via a second linear-function of the correction coefficient, so as to obtain a third linear-function;

expressing the wavefront aberration of the reconstructed light via the second linear-function of the correction coefficient by substituting the third linear-function for the first linear-function;

obtaining linear simultaneous equations which define the correction coefficient by partially-differentiating the third linear-function by the correction coefficient; and calculating the correction coefficient in accordance with said linear simultaneous equations.

16. A method as in claim 15, further comprising the step of:

calculating the correction coefficient again by correcting the correction coefficient if the evaluating amount calculated from the correction coefficient is not proper.

17. An apparatus using a holographic optical element designed in accordance with the method in claim 16.

18. A method according to claim 15, wherein an incident light onto each zone of the holographic optical element is generated from a aberration-correcting holographic optical element located at a previous stage, said method simultaneously calculating correction coefficients of interference fringes of both the holographic optical element and the aberration-correcting holographic optical element.

19. An apparatus using both the holographic optical element and the aberration-correcting holographic optical element designed in accordance with the method according to claim 18.

20. An apparatus using a holographic optical element designed in accordance with the method in claim 15.

* * * * *

UNITED STATES PATENT AND TRADEMARK OFFICE
CERTIFICATE OF CORRECTION

PATENT NO. : 5,361,149
DATED : November 1, 1994
INVENTOR(S) : Shinya HASEGAWA, et al.

It is certified that error appears in the above-indentified patent and that said Letters Patent is hereby corrected as shown below:

Col. 3, line 25, change "view" to --views--;

Line 41, change "21" to --22--.

Col. 5, Equation (9): change "$\Phi^k_{out}$" to --$\Phi_{out}^k$--;

Equation (9): change "$\Phi^{k(0)}_{out}$" to --$\Phi_{out}^{k(0)}$--.

Col. 6, Equation (15): change "$\Phi^{k(0)}_{out}$" to --$\Phi_{out}^{k(0)}$--;

Equation (18): change "$\Phi^k_{out}$" to --$\Phi_{out}^k$--.

Col. 7, Equation (21): change "$\Phi^{k(0)}_{out}$" to --$\Phi_{out}^{k(0)}$--;

Equation (23): change "$\Phi^{opt}_{in}$" to --$\Phi_{in}^{opt}$--;

Equation (23): change "$\Phi^{(k)}_{out}$" to --$\Phi_{out}^{(k)}$--;

Equation (24): change "$\Phi^k_{out}$" to --$\Phi_{out}^k$--;

Equation (24): change "$\Phi^{1(0)}_{out}$" to --$\Phi_{out}^{1(0)}$--

Equation (24): change "$\Phi^{k(0)}_{out}$" to --$\Phi_{out}^{k(0)}$--.

Col. 8, Equation (26): change "$\Phi^{K(N)}_{out}$" to --$\Phi_{out}^{K(N)}$--.

Page 1 of 3

UNITED STATES PATENT AND TRADEMARK OFFICE
CERTIFICATE OF CORRECTION

PATENT NO. : 5,361,149
DATED : November 1, 1994
INVENTOR(S) : Shinya HASEGAWA, et al.

It is certified that error appears in the above-indentified patent and that said Letters Patent is hereby corrected as shown below:

Col. 8, Equation (26): change "$\Phi_{H(0)}^{k}$" to --$\Phi_{H(0)}{}^{k}$--;

Equation (26): change "$\Phi_{H(A)(N)}^{k}$" to --$\Phi_{H(A)(N)}{}^{k}$--;

Equation (26): change "$\Phi_{OUT}^{k(0)(N-1)(A)}$" to --$\Phi_{OUT}{}^{k(0)(N-1)(A)}$--;

Equation (27): change "$\Phi_{H(A)(N)}^{0}$" to --$\Phi_{H(A)(N)}{}^{0}$--;

Equation (28): change "$C_{n+4}^{(N)}$" to --$C_{n+4}{}^{(N)}$--;

Equation (28): change "$C_{n+8}^{(N)}$" to --$C_{n+8}{}^{(N)}$--;

Col. 9, Equation (29): change "$C_{n+4}^{(N)}$" to --$C_{n+4}{}^{(N)}$--;

Equation (29): change "$C_{n+8}^{(N)}$" to --$C_{n+8}{}^{(N)}$--.

Equation (30): change "$\Phi_{out}^{K(N)}$" to --$\Phi_{out}{}^{K(N)}$--;

Equation (30): change "$\Psi_{m}^{k(N)}$" to --$\Psi_{m}{}^{k(N)}$--;

Equation (31): change "$\Phi_{H(0)}^{k}$" to --$\Phi_{H(0)}{}^{k}$--;

Equation (31): change "$\Phi_{out}^{k(0)(N-1)}$" to --$\Phi_{out}{}^{k(0)(N-1)}$--;

Equation (32): change "$\Phi_{OUT}^{k(0)(N-1)}$" to --$\Phi_{OUT}{}^{k(0)(N-1)}$--;

Col. 13, line 26, change "define" to --defined--.

UNITED STATES PATENT AND TRADEMARK OFFICE
CERTIFICATE OF CORRECTION

PATENT NO. : 5,361,149
DATED : November 1, 1994
INVENTOR(S) : Shinya HASEGAWA, et al.

It is certified that error appears in the above-indentified patent and that said Letters Patent is hereby corrected as shown below:

Col. 13, line 26, change "define" to --defined--.

Signed and Sealed this

Twenty-first Day of March, 1995

Attest:

BRUCE LEHMAN

Attesting Officer     Commissioner of Patents and Trademarks